July 18, 1961
B. MITCHELL ET AL
2,992,711
REINFORCING MEANS FOR ATTACHING STRUCTURAL
MEMBERS TO LIGHTWEIGHT CORRUGATED PANELS
Filed Nov. 16, 1959
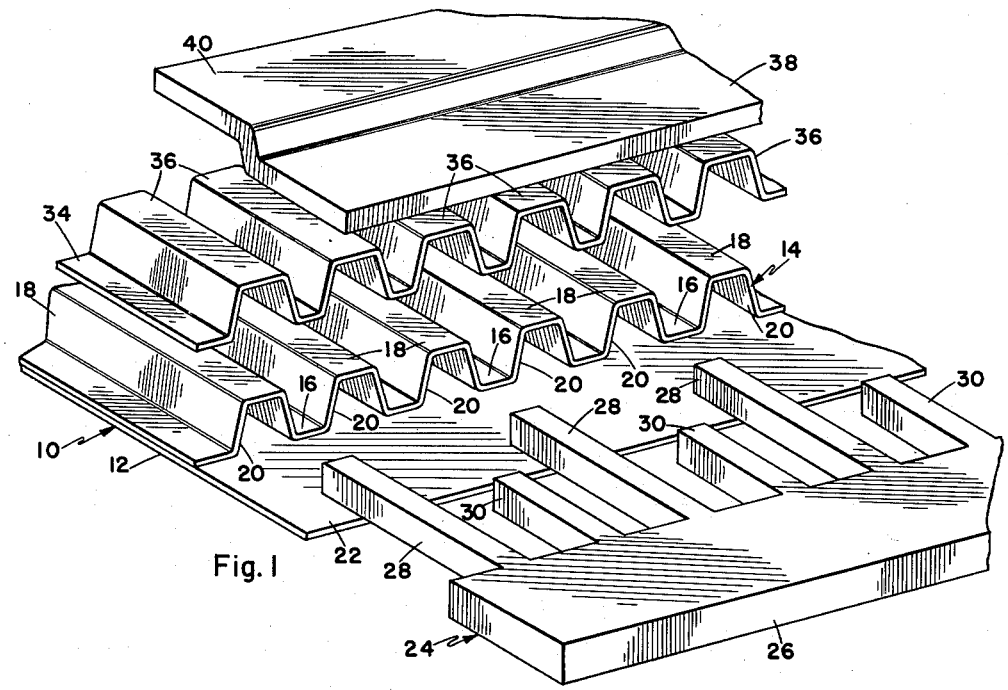
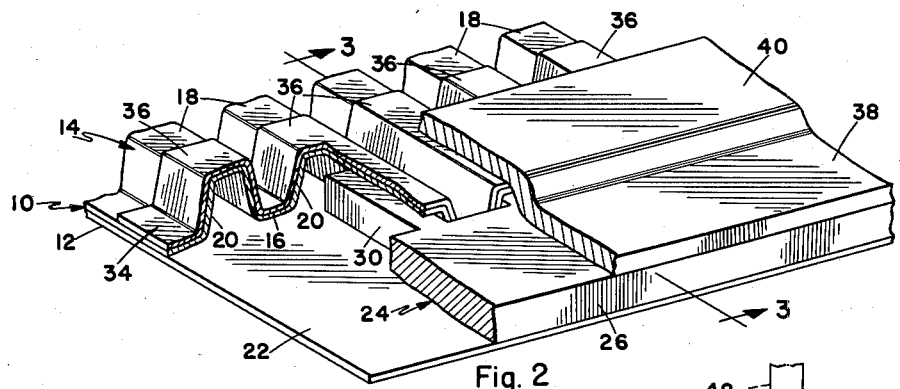
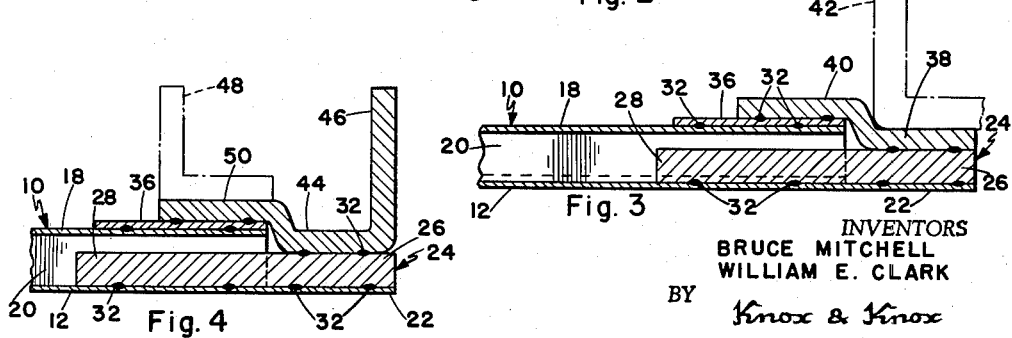
INVENTORS
BRUCE MITCHELL
WILLIAM E. CLARK
BY *Knox & Knox* ced July 18, 1961

2,992,711
REINFORCING MEANS FOR ATTACHING STRUCTURAL MEMBERS TO LIGHTWEIGHT CORRUGATED PANELS

Bruce Mitchell and William E. Clark, San Diego, Calif., assignors to Ryan Aeronautical Co., San Diego, Calif.
Filed Nov. 16, 1959, Ser. No. 853,331
6 Claims. (Cl. 189—36)

The present invention relates generally to light-weight structural panels and more particularly to a reinforcing means for attaching structural members to lightweight corrugated panels.

The primary object of this invention is to provide a means for reinforcing the edge of a lightweight corrugated panel for attachment to heavy supporting structure, the reinforcing elements being securely fastened to a considerable area of the panel.

Another object of this invention is to provide a reinforcing means having a plurality of fingers which fit into the corrugations, the fingers being of different lengths to avoid a definite line of strength differential between the reinforced and unreinforced portions of the panel.

Another object of this invention is to provide a reinforcing means for which many different types of structures, flat or curved, may be attached to the corrugated panel in such a manner as to distribute structural loads properly throughout the structure.

Finally, it is an object to provide a reinforcing means of the aforementioned character which is simple and convenient to assemble and which will produce efficient and durable structures.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

FIGURE 1 is an exploded, fragmentary perspective view of a corrugated panel and the reinforcing members;

FIGURE 2 is a fragmentary perspective view, partially cut away, of the assembled structure;

FIGURE 3 is a sectional view taken on the line 3—3 of FIGURE 2; and

FIGURE 4 is a sectional view, similar to FIGURE 3 showing an integral structural reinforcing member.

Similar characters of reference indicate similar or identical elements and portions throughout the specification and throughout the views of the drawing.

Referring now to FIGURES 1-3 of the drawing, the corrugated panel 10 comprises a skin 12 to one side of which a corrugated sheet 14 is attached, by welding or similar means, along the base portions 16 between the corrugations 18, and forming a plurality of spaced channels 20 between said skin and the corrugations. At the edge to be reinforced, the skin 12 has an extended portion 22 projecting beyond the corrugated sheet 14.

The primary reinforcing member 24 has a flat bar portion 26 equal in width to the width of the extended skin portion 22 and having a thickness substantially less than the height of the channels 20. Extending from one side of the bar portion 26 are a plurality of spaced fingers 28 and 30, all of said fingers being spaced to fit into the channels 20. The reinforcing member 24 is attached to the corrugated panel 10 by securing the fingers 28 and 30 to the skin 12, the bar portion 26 being secured to the extended skin portion 22. The attachment may be made by spotwelds, indicated typically at 32 in FIGURE 3, or by brazing, bonding, or the like. The fingers 28 and 30, being of different lengths, avoid the formation of a definite, continuous line of strength differential across the panel and distribute the loads over a greater portion of the corrugated structure. While two different finger lengths are illustrated as an example, it will be obvious that any variation of finger lengths may be used, according to stress requirements.

The corrugated panel 10, in the area of the fingers 28 and 30, is provided with a saddle member 34 having corrugations 36 which fit closely over the corrugations 18, said saddle member being attached to the corrugated panel by further spotwelds 32, or other means. The joint is completed by an attachment member 38, illustrated as a thick plate having a joggled portion 40 to allow for the combined thickness of the corrugations 18 and 36. The attachment member 38 is secured to the top face of the bar portion 26 and to the top surfaces of the corrugations 36.

The structure member to which the corrugated panel 10 is to be attached is indicated at 42 in FIGURE 3, said structural member being a spar, rib, frame, or other component. In assembly, the structural member 42 is normally secured to the attachment member 38, to which the saddle member 34 has been fastened. This assembly is then attached to the end of the corrugated panel 10 fitted with the reinforcing member 24. However, other orders of assembly may be used according to particular needs.

The configuration illustrated in FIGURE 4 shows a modified attachment member 44 having an integral flange 46 along one edge thereof, for direct attachment to adjacent structure by rivetting, bolting, or the like. Also, if necessary, an additional structural member 48 may be secured to the joggled portion 50 of the attachment member 44. It will be evident that many different types of attachment members may be used to integrate with various supporting structures and joints, the reinforcing member 24 and saddle member 34 providing the necessary rigidity and bonding surfaces.

The reinforcing means is specifically for use with lightweight corrugated parts for aircraft and the like, such as the corrugated steel panels manufactured under the trade name of "Miniwate." This type of corrugated panel is of extremely light construction and utilizes sheet material of .016 inches in thickness, or less, and possibly as thin as .002 inches. The depth of the corrugations is normally less than three eights of an inch, since in larger sizes, separate stiffeners become more practical. Due to the small dimensions and thin material, normal riveted, bolted, or ordinary surface welded joints are impractical, yet the panels must be reinforced for effective joining to each other and to adjacent structure. The reinforcing means described herein has been found to provide a very effective method of attaching the lightweight corrugated panels to supporting structure of considerable dimensions. Loads are transferred effectively throughout the entire structure, with no dangerous stress concentration. This is particularly important in aircraft, missiles and the like, in which the stresses are carried by the entire structure including the skins.

Since the fingers 28 and 30 are substantially smaller in cross section than the internal dimensions of the channels 20, tolerances are not critical and minor manufacturing variations in the corrugated sheet 14 do not affect assembly. In the assembly of the structure, the reinforcing member 24 is first attached to the skin 12 along the fingers 28 and 30 and the bar portion 26, the corrugated sheet 14 then being secured to the skin, so avoiding any blind welding. The corrugation base portions 16 are attached to the skin 12 between the fingers 28 and 30, the closely spaced, parallel lines of attachment extending for some distance. Thus, while the fingers 28 and 30 are not secured directly to the corrugations, the loads in the panel joint are carried through the fingers to the skin 12 and so to the corrugations. The reinforcing bar 24 is also tied to the corrugations through the attachment member 38 and the saddle member 34, making a fully integrated, load bearing structure.

The operation of this invention will be clearly comprehended from a consideration of the foregoing description of the mechanical details thereof, taken in connection with the above recited objects.

It is understood that minor variation from the form of the invention disclosed herein may be made without departure from the spirit and scope of the invention, and that the specification and drawing are to be considered as merely illustrative rather than limiting.

We claim:

1. A lightweight corrugated panel having reinforcing means for securing structural members thereto, comprising a corrugated sheet having a skin secured to one side thereof and defining a plurality of spaced, parallel channels between said skin and said corrugated sheet; said skin having an extended portion projecting beyond the end of said corrugated sheet: a reinforcing means, comprising a thick reinforcing member secured to said extended portion; said reinforcing member having a plurality of fingers projecting from one side thereof; said fingers extending into said channels and being secured along their length to said skin and said fingers being of different lengths to improve stress distribution when a structural member is secured to a corresponding edge portion of the panel.

2. In combination with a lightweight corrugated panel, comprising a corrugated sheet having a skin secured to one side thereof and defining a plurality of spaced, parallel channels between said skin and said corrugated sheet; said skin having an extended portion projecting beyond the end of said corrugated sheet: a reinforcing means, comprising a thick reinforcing member secured to said extended portion; said reinforcing member having a plurality of fingers projecting from one side thereof; said fingers extending into said channels and being secured along their length to said skin; and a structural attachment member fixed to said reinforcing member; said attachment member extending over and being fixed to said corrugated sheet where reinforced by said fingers.

3. In combination with a lightweight corrugated panel, comprising a corrugated sheet having a skin secured to one side thereof and defining a plurality of spaced, parallel channels between said skin and said corrugated sheet; said skin having an extended portion projecting beyond the end of said corrugated sheet: a reinforcing means, comprising a thick reinforcing member secured to said extended portion; said reinforcing member having a plurality of fingers projecting from one side thereof; said fingers extending into said channels and being secured along their length to said skin; a corrugated saddle member closely conforming to and secured externally to said corrugated sheet where reinforced by said fingers.

4. In combination with a lightweight corrugated panel, comprising a corrugated sheet having a skin secured to one side thereof and defining a plurality of spaced, parallel channels between said skin and said corrugated sheet; said skin having an extended portion projecting beyond the end of said corrugated sheet: a reinforcing means, comprising a thick reinforcing member secured to said extended portion; said reinforcing member having a plurality of fingers projecting from one side thereof; said fingers extending into said channels and being secured along their length to said skin; a corrugated saddle member closely conforming to and secured to said corrugated sheet where reinforced by said fingers; and a structural attachment member fixed to said reinforcing member; said attachment member extending over and being fixed to said saddle member.

5. In combination with a lightweight corrugated panel, comprising a corrugated sheet having a skin secured to one side thereof and defining a plurality of spaced, parallel channels between said skin and said corrugated sheet; said skin having an extended portion projecting beyond the end of said corrugated sheet: a reinforcing means, comprising a thick reinforcing member secured to said extended portion; said reinforcing member having a plurality of fingers projecting from one side thereof and extending into said channels and secured along their length to said skin; said fingers being of different lengths for stress distribution; and a corrugated saddle member closely conforming to and externally secured to said corrugated sheet where the latter is reinforced by said fingers.

6. In combination with a lightweight corrugated panel, comprising a corrugated sheet having a skin secured to one side thereof and defining a plurality of spaced, parallel channels between said skin and said corrugated sheet; said skin having an extended portion projecting beyond the end of said corrugated sheet: a reinforcing means, comprising a reinforcing member having a bar portion secured to and substantially equal in width to said extended skin portion; said bar portion having a plurality of fingers of different lengths projecting from one side thereof; said fingers extending into said channels and being substantially smaller in cross section than the internal cross sectional dimensions of said channels; said fingers being secured along their length to said skin; a corrugated saddle member closely conforming to and secured to said corrugated sheet where reinforced by said fingers; and a structural attachment member fixed to said reinforcing member; said attachment member extending over and being fixed to said saddle member.

References Cited in the file of this patent

UNITED STATES PATENTS

| | | |
|---|---|---|
| 1,665,916 | Eschholz | Apr. 10, 1928 |
| 2,105,280 | Bass | Jan. 11, 1938 |
| 2,258,858 | Meadowcroft | Oct. 14, 1941 |
| 2,845,151 | Reinhold | July 29, 1958 |